US011051132B2

(12) United States Patent
Chandramouli et al.

(10) Patent No.: US 11,051,132 B2
(45) Date of Patent: Jun. 29, 2021

(54) NETWORK LOCATION REPORTING BROADCAST BEARER MANAGEMENT

(71) Applicant: NOKIA SOLUTIONS AND NETWORKS OY, Espoo (FI)

(72) Inventors: Devaki Chandramouli, Plano, TX (US); David Navratil, Helsinki (FI); Rainer Liebhart, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/564,877

(22) PCT Filed: Apr. 7, 2015

(86) PCT No.: PCT/US2015/024713
§ 371 (c)(1),
(2) Date: Oct. 6, 2017

(87) PCT Pub. No.: WO2016/163995
PCT Pub. Date: Oct. 13, 2016

(65) Prior Publication Data
US 2018/0109911 A1    Apr. 19, 2018

(51) Int. Cl.
*H04W 76/40*    (2018.01)
*H04W 76/30*    (2018.01)
(Continued)

(52) U.S. Cl.
CPC ............. *H04W 4/06* (2013.01); *H04W 64/00* (2013.01); *H04W 76/40* (2018.02)

(58) Field of Classification Search
CPC ... H04W 76/00; H04W 76/32; H04W 76/002; H04W 4/02; H04W 4/06; H04W 76/40; H04W 76/30
(Continued)

(56) References Cited

U.S. PATENT DOCUMENTS 10,206,224 B2 *  2/2019  Li .................... H04W 76/30
10,694,540 B2 *  6/2020  Li .................... H04W 76/30
(Continued)

FOREIGN PATENT DOCUMENTS

CN    104 270 725 A    1/2015
EP    3 200 484 A1     8/2017
(Continued)

OTHER PUBLICATIONS

Keysight Technologies, "Signalling Radio Bearer (SRB) Parameters" Jan. 15, 2009.*
(Continued)

*Primary Examiner* — William D Cumming
(74) *Attorney, Agent, or Firm* — Squire Patton Boggs (US) LLP

(57) ABSTRACT

Various communication systems may benefit from network location reporting. For example, such reporting may be beneficial in the establishment of a multimedia broadcast/multicast service bearer for media traffic delivery from a group communication service application server or other similar device or system. A method can include reporting at least a first set of user equipment location information and at least a second set of user equipment location information from the user equipment to at least one network node for broadcast bearer management. The first set of user equipment location information can include a serving cell identity of the user equipment. The second set of user equipment location information can include at least one identity of at least one network service area for media broadcasting.

9 Claims, 3 Drawing Sheets

(51) Int. Cl.
*H04W 4/02* (2018.01)
*H04W 4/06* (2009.01)
*H04W 64/00* (2009.01)

(58) Field of Classification Search
USPC .................. 370/312; 709/224; 455/456.1
See application file for complete search history.

(56) References Cited

U.S. PATENT DOCUMENTS

| | | | |
|---|---|---|---|
| 2009/0245155 A1 | 10/2009 | Fukunaga et al. | |
| 2012/0236776 A1 | 9/2012 | Zhang et al. | |
| 2013/0097305 A1* | 4/2013 | Albal | H04W 76/00 709/224 |
| 2013/0279394 A1* | 10/2013 | Aramoto | H04W 76/002 370/312 |
| 2013/0279395 A1* | 10/2013 | Aramoto | H04W 76/32 370/312 |
| 2013/0324129 A1 | 12/2013 | Lee et al. | |
| 2014/0078923 A1 | 3/2014 | Guan et al. | |
| 2014/0177506 A1 | 6/2014 | Korus et al. | |
| 2016/0309522 A1* | 10/2016 | Li | H04W 76/40 |
| 2018/0109911 A1* | 4/2018 | Chandramouli | H04W 4/02 |
| 2019/0124679 A1* | 4/2019 | Li | H04W 4/06 |

FOREIGN PATENT DOCUMENTS

| | | |
|---|---|---|
| EP | 3 422 771 B1 * | 2/2020 |
| WO | WO2014183279 A1 * | 5/2013 |
| WO | WO 2013/110326 A1 | 8/2013 |

OTHER PUBLICATIONS

"Framework for enabling machine-type communication services", Jivesh Rajpal, IET Wireless Sensor Systems (vol. 7, Issue: 1, pp. 9-14) Nov. 2016 (Year: 2016).*

LTE location technologies and delivery solutions bySuma S. Cherian; Ashok N. Rudrapatna Published in: Bell Labs Technical Journal (vol. 18, Issue: 2, Sep. 2013) (Year: 2013).*

International Search Report & Written Opinion dated Jul. 9, 2015 corresponding to International Patent Application No. PCT/US2015/024713.

3GPP TS 23.246 V13.0.0 (Mar. 2015), Technical Specification, 3rd Generation Partnership Project; Technical Specification Group Services and System Aspects; Multimedia Broadcast/Multicast Service (MBMS); Architecture and functional description (Release 13), Mar. 2015.

3GPP TS 23.468 V13.0.0 (Mar. 2015), Technical Specification, 3rd Generation Partnership Project; Technical Specification Group Services and System Aspects; Group Communication System Enablers for LTE (GCSE_LTE); Stage 2 (Release 13), Mar. 2015.

Alcatel-Lucent, "MBMS Key Issues and Solution," 3GPP, S2-150186, SA WG2 Meeting #107, Jan. 26-30, 2015, Sorrento, Italy, pp. 1-7.

SA WG2, New WID on Study on MBMS Enhancements <FS_MBMS_enh>, 3GPP, TD SP-140883, 3GPP TSG SA Meeting #66, Maui, Hawaii, Dec. 10-12, 2014.

Oct. 10, 2017 International Preliminary Report on Patentability issued in International Patent Application No. PCT/US2015/024713.

General Dynamics UK Limited: "On using ECGI lists to define MBMS service areas," 3GPP SA WG2 Meeting #104, S2-142630, Jul. 2, 2014, 7 pages.

Huawei et al., "eMBMS roadcast areas with EUTRAN Cell Granularity," 3GPP SA WG2 Meeting #104, S2-142495, Jul. 2, 2014, 5 pages.

Extended European Search Report dated Oct. 16, 2018 corresponding to European Patent Application No. 15888648.1.

Communication pursuant to Article 94(3) EPC dated Oct. 22, 2019 corresponding to European Patent Application No. 15888648.1.

Communication pursuant to Article 94(3) EPC dated Oct. 16, 2020 corresponding to European Patent Application No. 15888648.1.

* cited by examiner

NETWORK LOCATION REPORTING BROADCAST BEARER MANAGEMENT

BACKGROUND

Field

Various communication systems may benefit from network location reporting. For example, such reporting may be beneficial in the establishment of a multimedia broadcast/multicast service bearer for media traffic delivery from a group communication service application server or other similar device or system.

Description of the Related Art

Group communication system enablers (GCSE) architecture can use a multimedia broadcast/multicast service (MBMS) broadcasting mechanism to establish group calls amongst multiple devices. MBMS is specified in 3GPP TS 23.246, which is hereby incorporated herein by reference in its entirety.

FIG. 1 illustrates Group Communication System Enablers (GCSE) architecture. Group Communication System Enablers for long term evolution (LTE) (GCSE_LTE) has been standardized in 3GGP Rel-12, as described in 3GPP TS 23.468, which is hereby incorporated herein by reference in its entirety. The architecture model of GCSE can allow for media traffic to be delivered with unicast and MBMS in downlink, as shown in FIG. 1.

As shown in FIG. 1, a group communication service (GCS) application server (AS) can communicate with a user equipment (pictured at left in the figure) over interface GC1 (GC1 was not specified in Rel-12 but is part of Rel-13 specification work). Moreover, the GCS AS can communicate for unicast communication over communication interface labelled Rx with a policy and charging rules function (PCRF) and over interface SGi with a packet data network (PDN) gateway (P-GW). For multicast/broadcast, the GCS AS can use user and control plane interfaces respectively labelled MB2-U and MB2-C. The MBMS system can connect to the user equipment via a fourth generation (4G) base station using interface LTE-Uu. This can be a base station that is configured to deliver the media traffic only via MBMS or via both MBMS and unicast, as shown in FIG. 1. See also FIG. 4.1-1 in 3GPP TS 23.468.

The request for MBMS bearer establishment can be done based on an MBMS service area. In case of GCS, this means that the GCS AS may need to be aware of configured MBMS service areas in the network. This may add significant complexity to maintain correct configuration data in GCS AS.

This issue is discussed by 3GPP TDoc SP-140883, New WID on Study on MBMS Enhancements <FS_MBM-S_enh>, which is hereby incorporated herein by reference in its entirety, which relates to possible improvements of MBMS bearer establishment based on a fine granular area, e.g. MBMS bearer establishment based on cell identifiers like ECGIs.

The issue is being discussed and solutions are being proposed in SA2, for example MBMS bearer establishment based on E-UTRAN cell global identifier (ECGI) list, as described for example in 3GPP TDoc S2-150186, MBMS Key Issues and Solution, which is hereby incorporated herein by reference in its entirety. The assumption in these solutions is that GCS AS is aware of the cell the UE is camping on via application layer signaling over GC1 interface (which is most probably SIP based).

In Rel-12, the reference point between UE and GCS AS for application signaling is called GC1. However, it is unclear how the GCS AS will obtain and/or learn the mapping between ECGI and SAI(s) in order to initiate MBMS bearer establishment using service area identities (this parameter may be required in order to retain backward compatibility to pre-Rel-13 versions of the standard) and cell IDs (ECGI) to provide fine granular location information. One option is manual configuration, which may incur unnecessary overhead and may be prone to errors. Thus, an automated mapping solution is seen necessary to avoid manual configuration, but there is no suitable automatic mapping solution amongst the conventional approaches.

3GPP TDoc S2-150186 proposes to allow MBMS bearer to be established based on a list of ECGIs. It is assumed that the UE reports its current serving cell identifier (ECGI) to GCS AS via GC1 reference point. GCS AS uses this information to request MBMS bearer activation, as described at section 6.A.1.1.1 of 3GPP TDoc S2-150186. This solution does not eliminate the need for maintenance of MBMS service area configuration. The burden of mapping from the cell identities to MBMS service areas is either still in the GCS AS or moved from GCS AS to the Broadcast Multicast Service Center (BM-SC). The BM-SC may need a mapping table from ECGI to service area identity. Mapping from cell identity to MBMS service area may be required to avoid changes to existing MBMS procedures that rely on presence of service area identities.

SUMMARY

According to certain embodiments, a method can include reporting at least a first set of user equipment location information and at least a second set of user equipment location information from the user equipment to at least one network node for broadcast bearer management. The first set of user equipment location information can include a serving cell identity of the user equipment. The second set of user equipment location information can include at least one identity of at least one network service area for media broadcasting. The service area can either be MBMS Service area or Tracking area or it can include both.

In certain embodiments, a method can include receiving at least a first set of user equipment location information and at least a second set of user equipment location information from the user equipment to at least one network node. The method can also include performing broadcast bearer management based on the received first set of user equipment location information and the received second set of user equipment location information. The first set of user equipment location information can include a serving cell identity of the user equipment. The second set of user equipment location information can include at least one identity of at least one network service area for media broadcasting. The service area can either be MBMS Service area or Tracking area or it can include both.

An apparatus, according to certain embodiments, can include at least one processor and at least one memory including computer program code. The at least one memory and the computer program code can be configured to, with the at least one processor, cause the apparatus at least to report at least a first set of user equipment location information and at least a second set of user equipment location information from the user equipment to at least one network node for broadcast bearer management. The first set of user equipment location information can include a serving cell identity of the user equipment. The second set of user equipment location information can include at least one identity of at least one network service area for media broadcasting. The service area can either be MBMS Service area or Tracking area or it can include both.

An apparatus, in certain embodiments, can include at least one processor and at least one memory including computer program code. The at least one memory and the computer program code can be configured to, with the at least one processor, cause the apparatus at least to receive at least a first set of user equipment location information and at least a second set of user equipment location information from the user equipment to at least one network node. The at least one memory and the computer program code can also be configured to, with the at least one processor, cause the apparatus at least to perform broadcast bearer management based on the received first set of user equipment location information and the received second set of user equipment location information. The first set of user equipment location information can include a serving cell identity of the user equipment. The second set of user equipment location information can include at least one identity of at least one network service area for media broadcasting. The service area can either be MBMS Service area or Tracking area or it can include both.

According to certain embodiments, an apparatus can include means for reporting at least a first set of user equipment location information and at least a second set of user equipment location information from the user equipment to at least one network node for broadcast bearer management. The first set of user equipment location information can include a serving cell identity of the user equipment. The second set of user equipment location information can include at least one identity of at least one network service area for media broadcasting. The service area can either be MBMS Service area or Tracking area or it can include both.

In certain embodiments, an apparatus can include means for receiving at least a first set of user equipment location information and at least a second set of user equipment location information from the user equipment to at least one network node. The apparatus can also include means for performing broadcast bearer management based on the received first set of user equipment location information and the received second set of user equipment location information. The first set of user equipment location information can include a serving cell identity of the user equipment. The second set of user equipment location information can include at least one identity of at least one network service area for media broadcasting. The service area can either be MBMS Service area or Tracking area or it can include both.

A computer program product can, according to certain embodiments, encode instructions for performing a process. The process can include any of the above-described methods.

A non-transitory computer-readable medium can, in certain embodiments, be encoded with instructions that, when executed in hardware, perform a process. The process can include any of the above-described methods.

BRIEF DESCRIPTION OF THE DRAWINGS

For proper understanding of the invention, reference should be made to the accompanying drawings, wherein.

DETAILED DESCRIPTION

Figure 1:
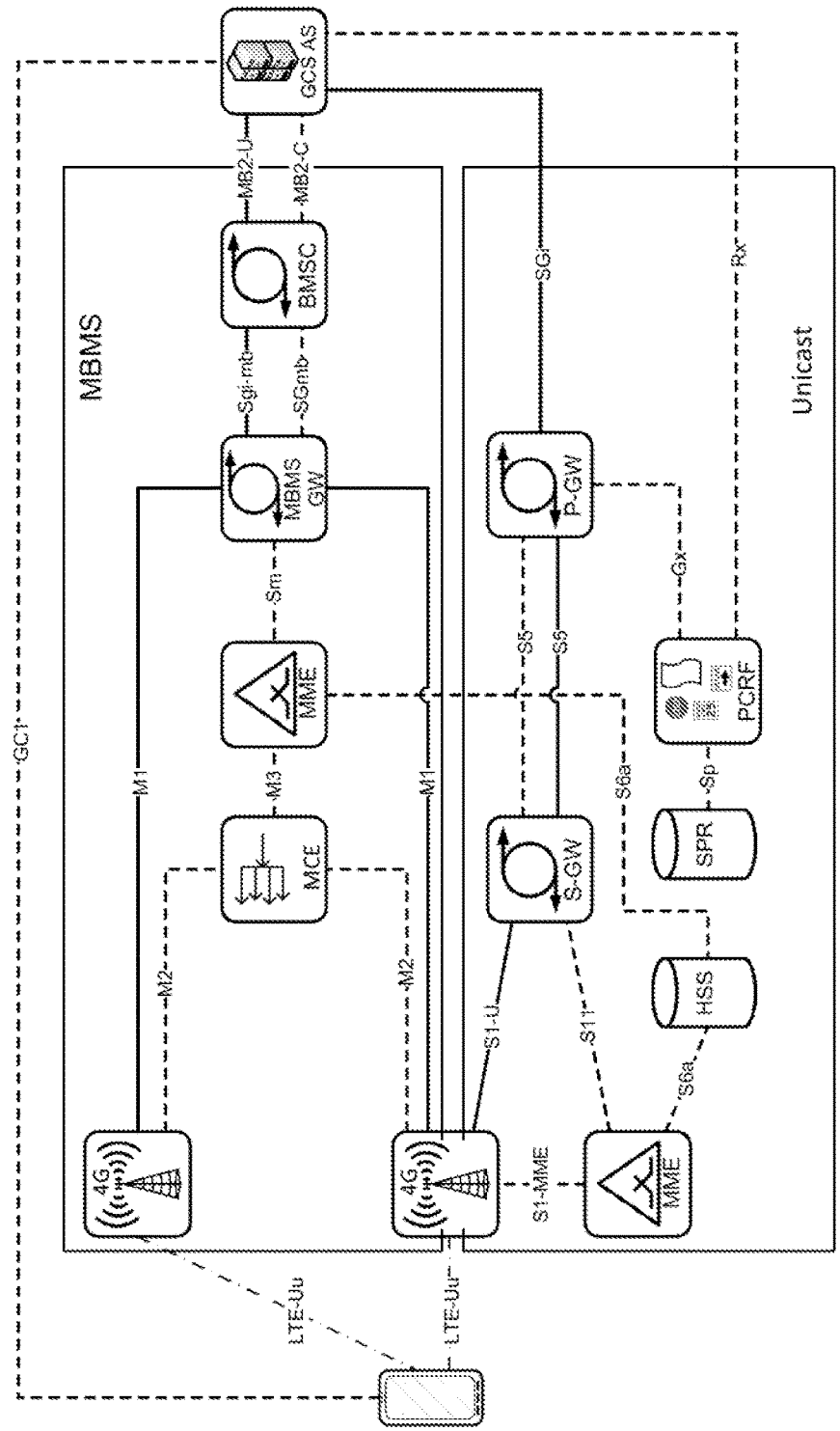
FIG. 1 illustrates Group Communication System Enablers (GCSE) architecture.

Certain embodiments relate to the establishment of multimedia broadcast/multicast service (MBMS) bearers for media traffic delivery from a group communication service (GCS) application server (GCS AS) or any other application server (also, referred to as content provider in the context of MBMS).

Certain embodiments report two sets of user equipment (UE) location information from the UE to network nodes or entities for the purpose of, for example, broadcast bearer management. One set of information can include at least the UE's serving cell identity and the other set of information can include at least identities of network service areas used for media broadcasting.

In certain embodiments, the identity of the network areas can be the MBMS service area identity (MBMS SAI) and/or tracking area identity (TAI), and the UE's serving cell identity can be the E-UTRAN cell global identifier (ECGI).

By adopting certain embodiments, the mapping between the cell identity and the identities of service/tracking areas may not need to be configured manually in a network node such as GCS AS or BM-SC; instead the mapping can be created dynamically. Similarly, TAI to ECGI mapping may not need to be configured manually in network nodes such as GCS AS, BM-SC and/or cell broadcast center (CBC). The UE can determine the serving cell identity, tracking area identity and the identities of the network service areas the serving cell belongs to from information broadcast in the serving cell.

The report of ECGI and SAI may be sent using a dedicated reporting procedure from UE to GCS AS or from the UE using existing or new signaling procedures to an intermediate node like the BM-SC, or a central database that can be accessed by the GCS AS or BM-SC. If the UE reports this mapping towards the BM-SC, BM-SC can either forward the SAI to ECGI mapping information via MB2 interface to GCS AS or the BM-SC can do the mapping itself. For example, the GCS AS can just send an ECGI list to BM-SC via MB2 and BM-SC can translate ECGI to SAI(s) based on the internally stored mapping table. The TAI can be sent in a similar way to an application server, the BM-SC, CBC or any other node that may use this information.

In E-UTRAN, the UE can determine the serving cell identity, tracking area identity and PLMN identity from System Information Broadcast Type 1 (SIB1). The serving cell identity and the PLMN identity form the E-UTRAN Cell Global Identifier (ECGI). Certain embodiments can rely on the network to provide the list of MBMS service area identities (SAI) for the serving cell. This can be achieved by broadcast of System Information Broadcast Type 15 (SIB15) including the intra-frequency list of SAI(s).

The UE can create a report of the following: (1) the ECGI of the serving cell and the list of MBMS SAI(s) offered by this cell, or (2) the ECGI of the serving cell and the tracking area identity offered by this cell.

In one example implementation, the UE can send the report to GCS AS via application layer signaling on GC1 interface, for example using a unicast bearer, or to any other trusted Application Server that may use this information. The application layer signaling could be e.g. SIP or HTTP based, or any other suitable application layer signaling protocol. In case it is based on SIP, REGISTER, INVITE and NOTIFY messages may be modified to carry both ECGI and list of SAI(s). Upon receipt of the report, the GCS AS can create a table that maps ECGI to MBMS SAI(s) (one or more SAI). When the GCS AS requests MBMS bearer establishment for group communication, the GCS AS can include the list of ECGIs and the list of MBMS SAIs that are serving the UEs of the group participating in the group communication. The list of MBMS SAIs may be e.g. a union or an intersection of MBMS SAIs from the reports received from UEs involved in a group communication and for which the GCS AS intends to request the media delivery via broadcast bearers. GCS AS may fall back to the union of service areas, if the intersection is an empty set, for example when UEs are at a border of MBMS service areas.

Another implementation alternative is that the UE can send the report to BM-SC using a unicast bearer. BM-SC can use this information to build the mapping table used for mapping EGCIs to MBMS SAIs in case a MBMS bearer activation request from GCS AS includes only the list of EGCIs. Alternatively, BM-SC can forward the information to GCS AS so that GCS AS creates the mapping table itself. The report can be sent to BM-SC using a new signaling procedure, for example based on SIP or HTTP or, if MBMS security is used, during the MBMS security context establishment and modification procedures using, for example, the MIKEY protocol. BM-SC address can be sent to the UE via GC1 or other means, for example during MBMS service announcement.

In similar or other ways the TAI can be sent from the UE to an application server, BM-SC, CBC or other nodes. GCS AS can be an example of an application server to which the TAI can be sent from the UE.

If the UE moves from one cell or service/tracking area to another and recognizes that the cell ID and/or service/tracking area changes (for example, by listening to the broadcast information), the UE can send a notification to the GCS AS, BM-SC, CBC or other node by one of the aforementioned techniques or any other suitable technique.

Figure 2:
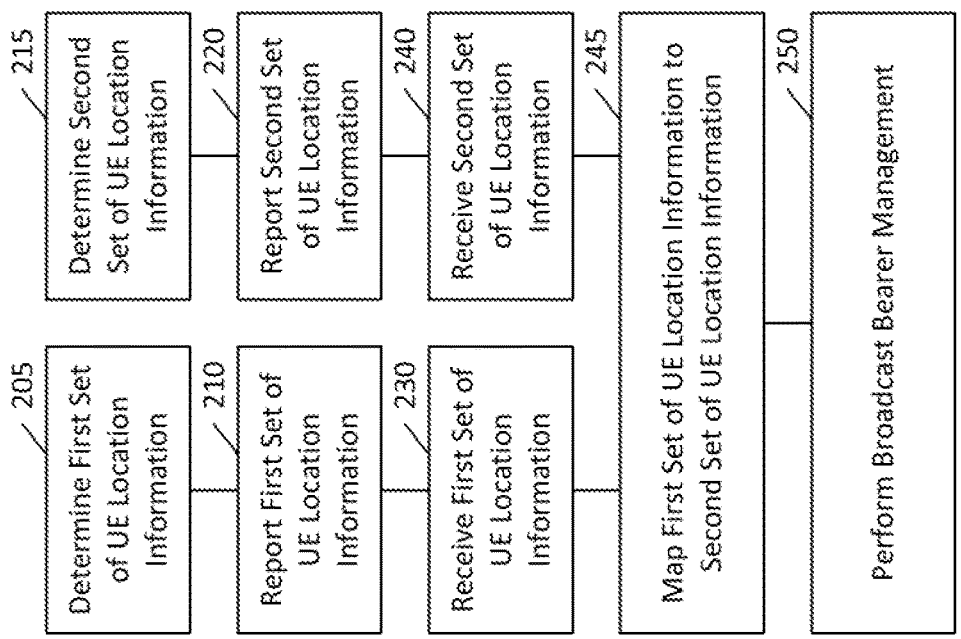
FIG. 2 illustrates a method according to certain embodiments.

FIG. 2 illustrates a method according to certain embodiments. As shown in FIG. 2, a method can include, at 210, reporting at least a first set of user equipment location information and, at 220, reporting at least a second set of user equipment location information from the user equipment to at least one network node for broadcast bearer management. Although these two reportings are shown as separate elements, the two reportings could be performed together in a single message, if desired.

The first set of user equipment location information can include a serving cell identity of the user equipment. The second set of user equipment location information can include at least one identity of at least one network service area for media broadcasting.

The identity of the network area can be a multimedia broadcast/multicast service (MBMS) service area identity and/or tracking area identity. Other identities are also permitted.

The serving cell identity of the user equipment can be a cell global identifier, such as an E-UTRAN Cell Global Identifier (ECGI). Other identities are also permitted.

As described above, the user equipment may obtain the information regarding these identities in various ways. Thus, the method can also include at 205, determining the first set of user equipment location information and, at 215, determining the second set of user equipment location information.

The reporting can be performed from the user equipment to a group communication service application server, any other application server (also, referred to as content provider in the context of MBMS) or to an intermediate node that can be accessed by the group communication service application server. The intermediate node can be a database or a broadcast multicast service center.

The method can also include, at 230, receiving at least a first set of user equipment location information and, at 240, receiving at least a second set of user equipment location information from the user equipment to at least one network node. These sets of location information may be received separately or together, and can be correlated with one another if received separately.

The method can further include, at 250, performing broadcast bearer management based on the received first set of user equipment location information and the received second set of user equipment location information.

The first set of user equipment location information can include a serving cell identity of the user equipment, and the second set of user equipment location information can include at least one identity of at least one network service area for media broadcasting. Thus, the first and the second sets of user equipment can be the same sets reported at 210 and 220, above. The receiving can be performed at a group communication service application server, at any other application server or at a broadcast multicast service center.

The method can further include, at 245, mapping from a cell identity to a multimedia broadcast multicast (MBMS) service area, wherein the broadcast bearer management is based on the mapping. More generally the method can include mapping the first set of user equipment location information to the second set of user equipment location information.

Figure 3:
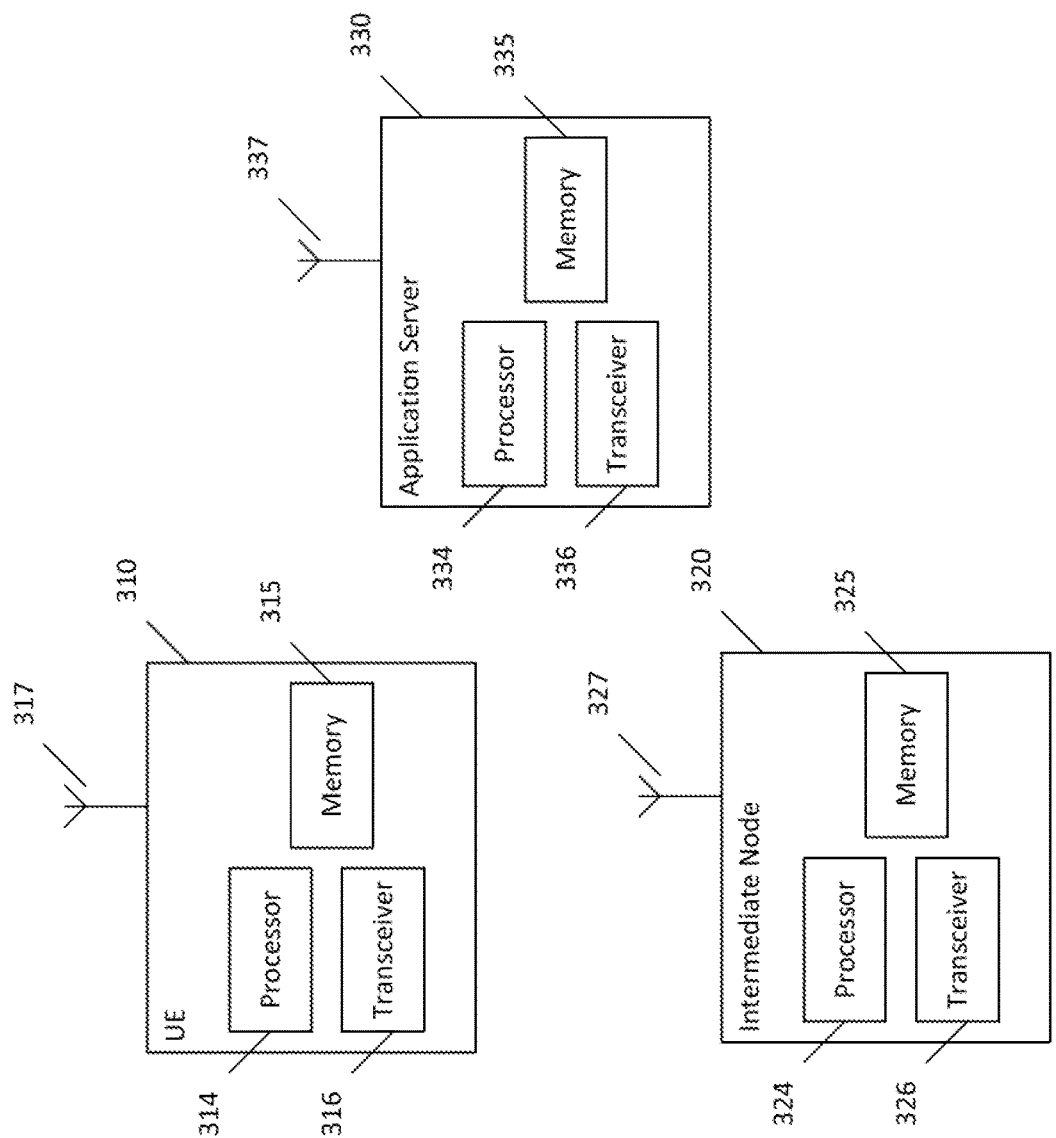
FIG. 3 illustrates a system according to certain embodiments.

FIG. 3 illustrates a system according to certain embodiments of the invention. In one embodiment, a system may include multiple devices, such as, for example, at least one UE 310, at least one intermediate node 320, which may be a BM-SC, database, or other network element, and at least one application server 330, which may be a GCS AS.

Each of these devices may include at least one processor, respectively indicated as 314, 324, and 334. At least one memory can be provided in each device, and indicated as 315, 325, and 335, respectively. The memory may include computer program instructions or computer code contained therein. The processors 314, 324, and 334 and memories 315, 325, and 335, or a subset thereof, can be configured to provide means corresponding to the various blocks of FIG. 2.

As shown in FIG. 3, transceivers 316, 326, and 336 can be provided, and each device may also include an antenna, respectively illustrated as 317, 327, and 337. Other configurations of these devices, for example, may be provided. For example, application server 330 may be configured for wired communication only, and in such a case antenna 337 can illustrate any form of communication hardware, without requiring a conventional antenna.

Transceivers 316, 326, and 336 can each, independently, be a transmitter, a receiver, or both a transmitter and a receiver, or a unit or device that is configured both for transmission and reception.

Processors 314, 324, and 334 can be embodied by any computational or data processing device, such as a central processing unit (CPU), application specific integrated circuit (ASIC), or comparable device. The processors can be implemented as a single controller, or a plurality of controllers or processors.

Memories 315, 325, and 335 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as UE 310, intermediate node 320, and application server 330, to perform any of the processes described herein (see, for example, FIG. 2). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 3 illustrates a system including a UE, intermediate node, and application server, embodiments of the invention may be applicable to other configurations, and configurations involving additional elements. For example, not shown, additional UEs may be present, and additional core network elements may be present, as illustrated in FIG. 1.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

LIST OF ABBREVIATIONS

BM-SC Broadcast Multicast Service Center
CBC Cell Broadcast Center
ECGI E-UTRAN Cell Global Identifier
GCS Group Communication Services
GCS AS GCS Application Server
GCSE Group Communication System Enablers
HTTP Hypertext Transfer Protocol
LTE Long-term Evolution
MBMS Multimedia Broadcast/Multicast Services
MIKEY Multimedia Internet KEYing
SAI Service Area Identity
SIB System Information Block
SIP Session Initiation Protocol
TAI Tracking Area Identity
UE User Equipment

We claim:

1. A method, comprising:
reporting at least a first set of user equipment location information and at least a second set of user equipment location information from a user equipment to at least one network node for broadcast bearer management,
wherein the reporting comprises reporting from the user equipment to a group communication service application server for mapping the first set of user equipment location information and the second set of user equipment location information at the group communication service application server,
wherein the first set of user equipment location information comprises a serving cell identity of the user equipment,
wherein the second set of user equipment location information comprises at least one identity of at least one network service area for media broadcasting, and
wherein broadcast bearer management is based on the at least first set of user equipment location information and the at least second set of user equipment location information.

2. The method of claim 1, wherein the identity of the network service area comprises a multimedia broadcast/multicast service (MBMS) service area identity and/or tracking area identity.

3. The method of claim 1, wherein the serving cell identity of the user equipment comprises a cell global identifier.

4. A method comprising:
receiving at least a first set of user equipment location information and at least a second set of user equipment location information from the user equipment to at least one network node, wherein the receiving comprises receiving at a group communication service application server for mapping the first set of user equipment location information and the second set of user equipment location information at the group communication service application server; and
performing broadcast bearer management based on the received first set of user equipment location information and the received second set of user equipment location information,
wherein the first set of user equipment location information comprises a serving cell identity of the user equipment,
wherein the second set of user equipment location information comprises at least one identity of at least one network service area for media broadcasting, and
mapping from a cell identity to one or more multimedia broadcast multicast (MBMS) service areas, wherein the broadcast bearer management is based on the mapping.

5. An apparatus, comprising:
at least one processor; and
at least one memory including computer program code,
wherein the at least one memory and the computer program code are configured to, with the at least one processor, cause the apparatus at least to
report at least a first set of user equipment location information and at least a second set of user equipment location information from the user equipment to at least one network node for broadcast bearer management,
wherein the reporting comprises reporting from the user equipment to a group communication service application server for mapping the first set of user equipment location information and the second set of user equipment location information at the group communication service application server,
wherein the first set of user equipment location information comprises a serving cell identity of the user equipment,
wherein the second set of user equipment location information comprises at least one identity of at least one network service area for media broadcasting, and wherein broadcast bearer management is based on the at least first set of user equipment location information and the at least second set of user equipment location information.

6. The apparatus of claim 5, wherein the identity of the network service area comprises a multimedia broadcast/multicast service (MBMS) service area identity and/or tracking area identity.

7. The apparatus of claim 5, wherein the serving cell identity of the user equipment comprises a cell global identifier.

8. An apparatus comprising:
at least one processor; and
at least one memory including computer program code,
wherein the at least one memory and the computer program code are configured to, with the at least one processor, cause the apparatus at least to
receive at least a first set of user equipment location information and at least a second set of user equipment location information from the user equipment to at least one network node, wherein the receiving comprises receiving at a group communication service application server for mapping the first set of user equipment location information and the second set of user equipment location information at the group communication service application server; and
perform broadcast bearer management based on the received first set of user equipment location information and the received second set of user equipment location information,
wherein the first set of user equipment location information comprises a serving cell identity of the user equipment,
wherein the second set of user equipment location information comprises at least one identity of at least one network service area for media broadcasting, and
wherein the at least one memory and the computer program code are configured to, with the at least one processor, cause the apparatus at least to map from a cell identity to one or more multimedia broadcast multicast (MBMS) service areas, wherein the broadcast bearer management is based on the mapping.

9. A non-transitory computer-readable medium encoded with instructions that, when executed in hardware, perform a process, the process comprising the method according to claim 1.

* * * * *